Nov. 7, 1944.  A. NAZAR  2,362,021
ELECTRIC DASHBOARD INSTRUMENT
Original Filed Nov. 10, 1937
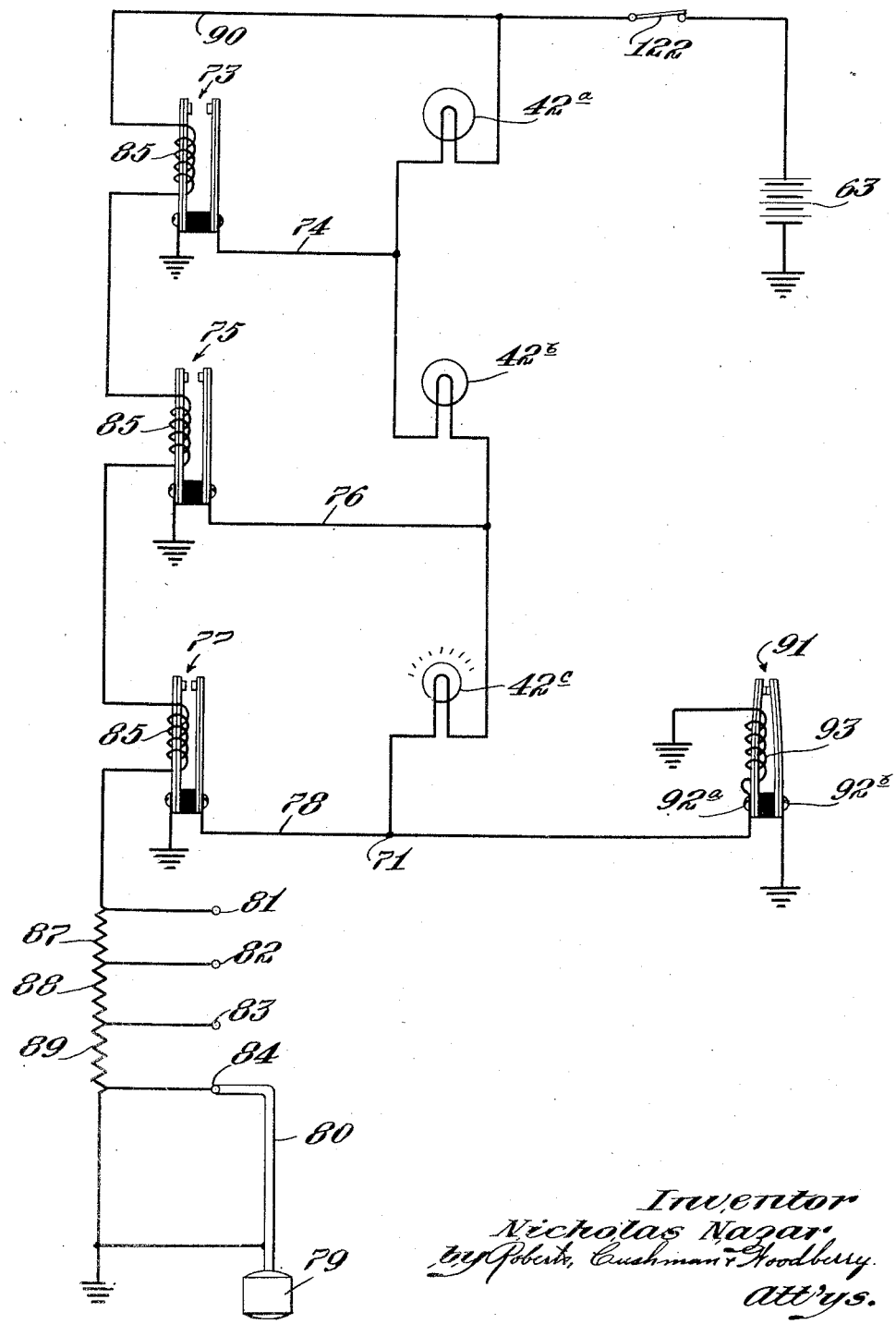

Patented Nov. 7, 1944

2,362,021

UNITED STATES PATENT OFFICE 2,362,021

ELECTRIC DASHBOARD INSTRUMENT

Nicholas Nazar, Newton, Mass., assignor to Waltham Watch Company, Waltham, Mass., a corporation of Massachusetts Original application November 10, 1937, Serial No. 173,873. Divided and this application April 10, 1941, Serial No. 387,901

3 Claims. (Cl. 177—311)

The present invention relates to dashboard instruments in general, and relates more particularly to dashboard instruments having as a component part thereof a visual signal designed to inform the operator that the particular variable factor, whose magnitude or condition is being indicated by the instrument, has reached some predetermined value.

The instant application is a division of copending parent application Serial No. 173,873, filed November 10, 1937, now Patent No. 2,238,071, dated April 15, 1941.

One of the objects of the present invention is to provide an instrument of the aforesaid character having visual signal means so constructed and arranged, and operating in such manner, as instantly and persistently to attract the operator's attention, thereby quickly and unfailingly to inform the operator that the particular factor being indicated by said instrument has reached some predetermined critical value or range.

Another object of the present invention is to achieve the foregoing with little, if any, distraction of the operator's attention from the field of view in front of the vehicle.

Another object of the present invention is to provide a dashboard indicating instrument wherein a flashing warning signal will automatically commence operation when the magnitude of the factor being indicated by said instrument has reached some critical value or range normally requiring the operator's immediate attention.

Another object of the present invention is to provide an indicator instrument having a single visual signal element arranged selectively to indicate two different stages or ranges of the factor being shown by said instrument.

Another object of the present invention is to provide an indicator instrument having a single signal lamp arranged to light up and glow steadily when the magnitude of the factor being indicated by said instrument reaches some predetermined value or range, and thereafter to flash intermittently when the magnitude of said factor has reached some predetermined more critical value or range.

Another object of the present invention is to provide an indicator instrument having a plurality of signal lamps arranged selectively to glow steadily, to indicate different relative magnitudes of the factor being indicated by said instrument, with at least one of said same lamps being further arranged to flash intermittently to indicate some critical condition.

Another object of the present invention is to provide a new and useful electric fuel-level indicator or gauge, devoid of moving parts, adapted to be mounted in an automobile under the eye of the driver, and to be actuated by current from the storage battery of the automobile, to give necessary information as to the magnitude of the fuel supply.

Another object of the present invention is to provide an instrument which will indicate the magnitude or condition of the fuel supply by means of different light signals, said instrument being devoid of moving parts at its dial or face.

Another object of the present invention is to provide an instrument of the aforesaid character which is simple and compact and of durable construction, which is accurate in use, which may be quickly and easily serviced when necessary and at little cost, and which is yet relatively inexpensive to produce.

With the above and other objects in view which appear more fully from the following detailed description, accompanying drawing and appended claims, the present invention, in one of its aspects, may comprise a dashboard gasoline-level indicator having a signal lamp arranged to glow steadily when the gasoline supply is low, and a signal lamp arranged to flash intermittently when said gasoline supply is almost exhausted.

The present invention, in another of its many aspects, may comprise an indicator instrument having means for indicating the magnitude or condition of a variable factor, a signal light in relatively close proximity to the aforesaid indicating means, and means controlled by the magnitude of the factor being indicated for intermittently flashing said light signal when the magnitude of said factor has passed beyond some predetermined limit.

The present invention in another of its many aspects may comprise a liquid-level indicator having a plurality of different signal lamps arranged for selective steady illumination in accordance with the level of the liquid, and means, operatively associated with the particular lamp indicating the lowest level of said liquid, for causing said latter lamp to flash intermittently when said liquid level has descended still further to some critical low value.

For the purpose of illustrating the invention, there is shown in the accompanying drawing a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawing, wherein like reference characters indicate like parts, the single figure is a diagram of the electrical circuits and circuit closing means of the illustrated embodiment.

The particular embodiment of the invention chosen for the purpose of illustration consists of three lamps which are designated in the diagrammatic figure as 42a, 42b and 42c. They are connected in series between the source of current, i. e., one pole of the storage battery, and the frame of the automobile, which is here designated as ground, and through which the circuit is completed to the opposite pole of the battery.

Individual switches between each of the lamps herein described and ground are provided at some convenient point adjacent to the indicating instrument. A switch 73 is connected between lamps 42a and 42b, a switch 75 between lamps 42b and 42c, and a switch 77 is connected to the lamp circuit below the lamp 42c. When switch 73 is closed the lamps 42b and 42c are short-circuited, and when 75 is closed, lamp 42c is short-circuited. These two switches suffice for operation of a three-stage indicator if the third lamp is connected to ground. The third switch 77 is provided, cooperating with other apparatus, presently described, to cause flashing of the lamp 42c when the fuel is dangerously low. These lamps have respectively different resistances and their resistances and the current are mutually so adjusted or regulated with respect to one another that, when the full service current flows through two or three connected in series, only the one having the highest resistance (greatest voltage drop between its terminals) will light. If it be assumed that lamp 42c has the highest resistance, and 42b a resistance intermediate those of 42c and 42a, then if switch 77 is closed and the other two switches are open, while current flows, only the lamp 42c will emit light. If switch 75 is closed while switch 73 remains open, a short circuit will be established around lamp 42c of low enough resistance to prevent this lamp from giving light, even though switch 77 may be closed at the same time, and the stronger current then flowing though lamp 42b will cause this lamp to be lighted. Likewise closing of switch 73 establishes a short circuit around lamps 42b and 42c, allowing enough current to pass though lamp 42a to light it, even though the other two switches may be closed at the same time. This is an important feature of the invention; namely, that the several lamps are in series connection, have respectively different resistances sufficient to cause only one of them to glow when two or more are in circuit at the same time, and short circuiting means are provided to divert current from the lamp or lamps of relatively higher resistance and increase the current through the lamp or lamps of lower resistance, with such intensity as to cause the one of the remaining lamps which has the higher resistance to emit light.

The switches 73, 75 and 77 may be operated by the level of gasoline in the fuel tank through any on of a variety of means within the scope of that phase of the invention last described. Consequently the description which follows, of one specific controlling means is not to be construed as a limitation of the foregoing phase of the invention.

The control means here described is operated by a float 79 in the fuel tank, which is shown only in a diagrammatic way but may be of any suitable construction and guided by any suitable means, the necessities and nature of which are so well known to persons acquainted with the devices heretofore used for showing fuel level in automobile tanks as to require no detailed illustration or description. It is sufficient to say that the float in its rise and descent operates an arm 80 which may be suitably connected in an electric circuit to close circuits through different ones of a succession of contacts 81, 82, etc. Whether the arm 80 is carried directly by the float, as indicated here, or is supported independently and moved in some manner by the float is immaterial for the purpose of this description. The switches 73, 75 and 77 are thermally operated bimetallic strips with each of which is associated a heating coil 85 connected in series circuit between the battery 61 and ground. But preferably, in order to compensate for the ambient temperature each switch is made of two like bimetallic strips mounted in parallel on an insulating base with the dissimilar metals of the two like strips adjacent to one another. Control of the switches by temperature changes is used in order to damp out the effects of agitation and surging of the liquid in the tank. An appreciable time is required for heating or cooling of the coils and switches enough to close and open them, wherefore the lights are not affected by momentary shifts of the liquid and float when the automobile passes over bumps.

In order to avoid duplication of wires running the length of the vehicle body from switches in or near the gauge to the tank, I prefer to control the circuit of the heater coils by means of a rheostat near the tank, from which only a single wire 86 need be run to the switches near the gauge. The rheostat consists of resistances 87, 88 and 89, between taps with which the contacts 81, 82, 83 and 84 are connected. These resistances are connected in series with the heating coils 85 of the short circuiting switches and with a conductor 90 leading through ignition switch 122 to battery 63.

The several switches 73, 75 and 77 are dissimilar to one another to the extent that they are caused to close by currents of respectively different magnitudes and the rheostat and its tap conductors are so arranged with respect to the float operated switch, that when the tank is full maximum current flows through the heater circuit, and when the switch arm engages the contacts 82, 83 and 84 respectively the current is progressively reduced. With this arrangement the strongest current flow causes switch 73 to close, such flow occurring when the float switch closes the circuit at contact 81. When the float switch is at contact 82, the current flow is reduced, permitting switch 73 to open and causing switches 75 and 77 to remain closed; the current flowing when the float switch makes contact at 83 permits switch 75 to open and causes switch 77 to remain closed, and when the tank is so nearly empty that the float switch leaves contact 83, and engages 84, the rheostat cuts down the current so that all of the switches open. The float switch is grounded on the automobile structure so that it short circuits more or fewer of the resistances of the rheostat according to the quantity of fuel in the tank. Preferably the contact members of the float switch and rheostat are so made and located that there will be a minimum time lag between the opening of the circuit at one contact and closing of the circuit at the next contact, in order that the proper lamp at the dashboard instrument will be illuminated at all times.

The switches 73, 75 and 77 may be made selectively responsive to different temperatures in any one of several ways, as (a) by making the separation between their contacts greatest for switch 73, less for switch 75 and least for switch 77; (b) by making the bimetallic strip of switch 73 of greater thickness so that more heat will be required to deflect it a given amount, and making the strips of switches 75 and 77 of less and still less thickness; and (c) by making the resistance of the heating coil of switch 73 less than of the other coils, so that more current will be required to heat it to a given degree, and making the coil of switches 75 and 77 with respectively higher and higher resistances.

As disclosed in the aforesaid parent patent, lamp 42a is behind a green light filter, 42b behind an amber light filter, and 42c behind a red filter. Hence when the tank is full a green light shows, when the float switch leaves contact 81 and engages contact 82, an amber light shows, and when the float switch leaves contact 82 and engages contact 83, a red light shows; each of these light indications being exclusive. By suitably locating these contacts and making them longer or shorter in the direction in which the switch arm moves, the change from one light indication to another may be made to occur when the gasoline level is at any selected height in the tank.

I have also provided for making the red light flash when the level is so low that immediate replenishment is required. This may be accomplished by a thermally operated switch 91 in a shunt circuit between the point 71 and ground. A conductor from this binding post leads to a connection at 92a with both the bimetallic contact member of this switch and with one terminal of a heater coil 93 surrounding such bimetallic element, and the opposite terminal of the coil is connected with the complemental contact member of the switch at 92b, and also with ground. When the contacts of this switch are separated, enough current flows through the coil 93 to heat and bend the bimetallic contact, whereby the switch is closed and the heating coil short circuited. The current through the coil is thus reduced so much that it cools off and allows the switch to open. This last named switch operates only when all of the switches 73, 75 and 77 are open. Under such conditions only is the current flow through the coil 93 great enough to generate heat effective to close the switch. The resistance of coil 93 is so great that it allows only enough current to flow through the lamp 42c to produce a dim light, but when the switch is closed enough current passes to make the light bright. Thus a flashing effect is produced.

If closer indications of fuel level are desired, the same principle may be extended to a series of four or more lights by duplication of elements here disclosed.

It will be appreciated that the hereinabove described indicator embodies the following principle, i. e., two or more electrical units in series circuit, of respectively different resistances such that only one of them is operated when the full current passes through the circuit, combined with a shunt circuit connected at a point between such electrical devices and adapted to be opened and closed by a switch, with the effect of activating the electrical device of lower resistance and disabling the higher resistance device. Other specific electrical devices than incandescent lamps may be used, although I consider lamps to be preferable. It will be understood that the lamps here shown may be considered as typical of all devices which may be applied and used for the purpose.

In this connection it will be noted that with the illustrated arrangement of the indicator lamps in series, the inactive lamps act as ballast resistances for the active lamp when the same current flows through them all, thereby reducing the magnitude of said current and materially increasing the useful life of said lamps.

The description of the particular means by which a liquid, in rising and descending influences different indicators of liquid level is not to be deemed a limitation. I have devised other and simpler means than those here shown, which are perfectly satisfactory for use in circumstances where damping out of the effect of waves and surges in the liquid is not important, or where there is no objection to running a multiplicity of wires from the indicator instrument to the tank. I have used installations in which the conductors 74, 76, 78, or their equivalents, are run directly to contacts 81, 82, etc., or their equivalents, respectively. And I have used a single switch adjacent to such contacts, operated by a float in the tank through a pivoted arm to the free end of which the float is secured, a cam on the pivot shaft of such arm, and a diaphragm between the cam and switch, suitably arranged so that the switch is caused to close circuit with the contacts successively as the float rises, and break circuit successively as the float descends, and vice versa.

From the foregoing it will be evident that the present invention comprises a control system having a plurality of lamps or other devices in a series circuit, a source of current in the circuit for energizing the devices, a branch circuit connected to the series circuit between each pair of adjacent devices for shunting part of the devices, and a controller for selectively closing the branch circuits to shunt the devices successively, the devices being selectively responsive to different degrees of current from the source and the responsiveness decreasing in the order in which the devices are successively shunted, the most responsive device being shunted first and the next succeeding device responding when each device is shunted. The system may also comprise an automatic flasher in the series circuit beyond the series of lamps, next to the most responsive lamp, together with an additional branch circuit for shunting the flasher. Preferably the branch circuits are controlled by a switch for each circuit and an actuator for each switch, the actuators being connetced in series and being selectively responsive to different degrees of current. While the current in the control circuit may be varied in various ways it is preferably varied by means of resistance elements which are progressively shunted.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. An indicator system comprising a plurality of devices in a series circuit, said devices including a plurality of lamps and an automatic flasher following the last lamp, a source of current in the circuit for energizing the lamps, a branch circuit connected to said circuit between each pair of adjacent lamps and between said flasher and last lamp for shunting part of said devices, and a controller for selectively closing said branch circuits to shunt said devices successively, said devices being selectively responsive to different degrees of current from said source, the responsiveness decreasing in the direction away from the flasher, the most responsive device being shunted first and the next succeeding device responding when each device is shunted, whereby said last lamp flashes when all said branches are open and lights continuously when the branch between the flasher and last lamp is closed.

2. A control system comprising three devices in a series circuit, a source of current in the circuit for energizing the devices, a branch circuit connected to said circuit between each pair of adjacent devices for shunting part of said devices, a switch in each of said branch circuits, an actuator for actuating each of the switches, and control means for selectively energizing said actuators to shunt said devices successively, said devices being selectively responsive to different degrees of current from said source, the responsiveness decreasing in the order in which the devices are successively shunted, the most responsive device being shunted first and the next succeeding device responding when each device is shunted.

3. A control system comprising a plurality of devices in a series circuit, a source of current in the circuit for energizing the devices, a branch circuit connected to said circuit between each pair of adjacent devices for shunting part of said devices, a switch in each of said branch circuits, an actuator for actuating each of the switches, a control circuit for energizing said actuators, the actuators being connected in series and being selectively responsive to different degrees of current for shunting said devices successively, said devices being selectively responsive to different degrees of current from said source, the responsiveness decreasing in the order in which the devices are successively shunted, and a controller for varying the current in said control circuit.

NICHOLAS NAZAR.